Oct. 25, 1966     A. R. PARILLA     3,280,608
INCREMENTAL TUBE OR VESSEL EXPANDER
Filed July 28, 1959     2 Sheets-Sheet 1

INVENTOR.
ARTHUR R. PARILLA
BY
Morgan, Finnegan, Durham & Pine
ATTORNEYS

Oct. 25, 1966   A. R. PARILLA   3,280,608
INCREMENTAL TUBE OR VESSEL EXPANDER
Filed July 28, 1959                                    2 Sheets-Sheet 2
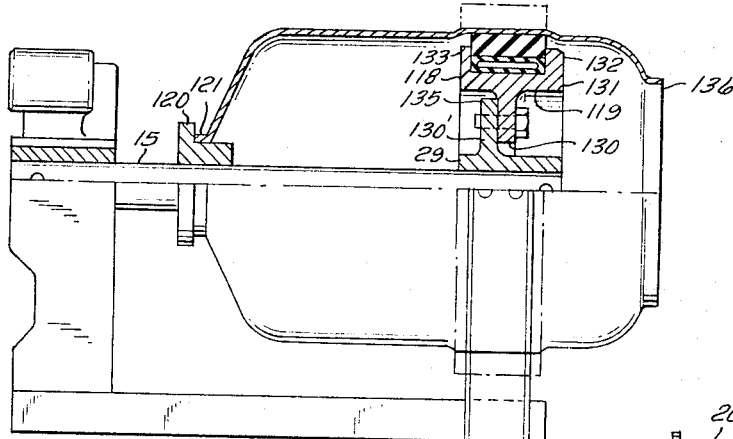
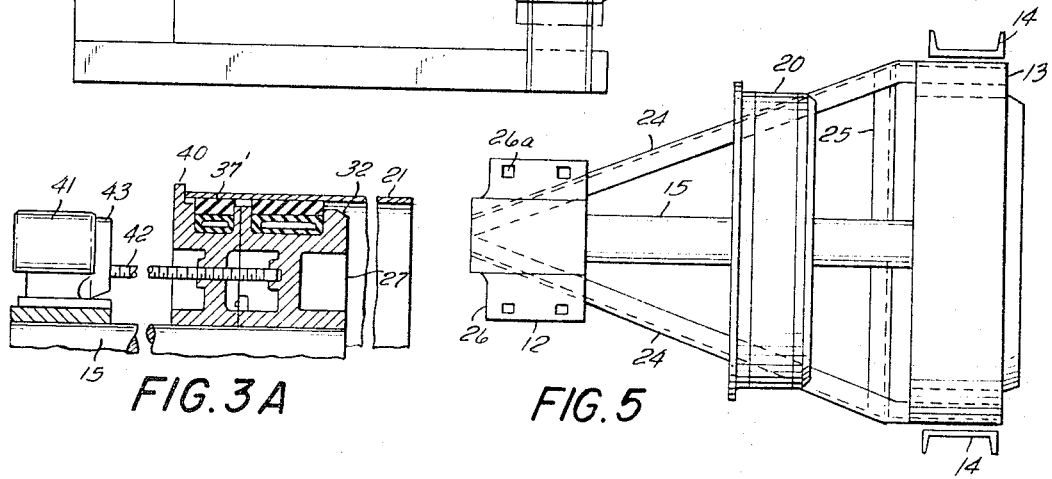
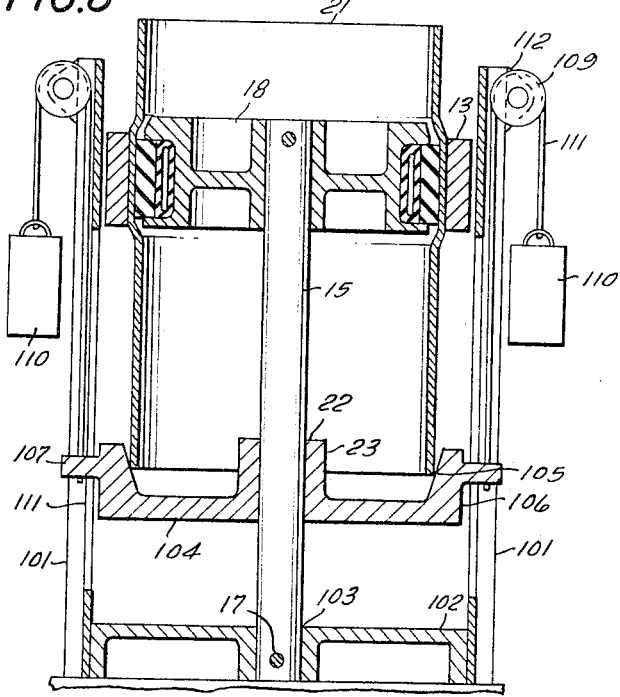
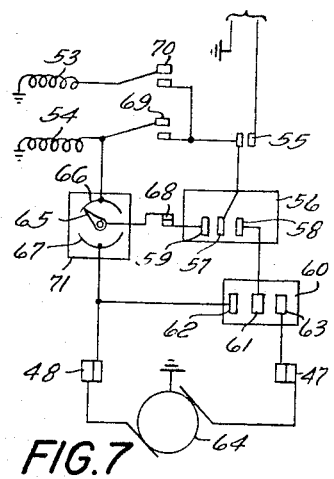
INVENTOR.
ARTHUR R. PARILLA
BY
Morgan, Finnegan, Durham & Pine
ATTORNEYS United States Patent Office 3,280,608
Patented Oct. 25, 1966

3,280,608
INCREMENTAL TUBE OR VESSEL EXPANDER
Arthur R. Parilla, 34 Crestview Road,
Mountain Lakes, N.J.
Filed July 28, 1959, Ser. No. 830,141
13 Claims. (Cl. 72—58)

This invention relates to improved means for fabricating thin-walled, ultra high strength pressure vessels such as used in solid propellant rocket cases, fuel tanks for missiles, and similar components. It is more specifically related to means for fabricating the cylindrical shells of such pressure vessels to provide improved high accuracy and reproductibilty for greater reliability.

One method currently used to fabricate such pressure vessels is by rolling a flat sheet of metal into cylindrical form and performing a longitudinal weld at the butt joint, the part thus formed being described as a shell. Suitable end closures, such as semi-elliptical or hemi-spherical head closures, are then attached to the shell at each end by girth welds. The structure thus formed then undergoes various heat treatment processes, increasing the tensile strength to the desired stress level.

For missile applications, it is essential that such vessels be made of extremely thin walls, operating at ultra high strength levels, in order to conserve weight.

Eccentricities due to mis-match of mating parts create high local stress concentrations. This is illustrated (in exaggerated scale) in FIGURE 1 where "$e$" represents the eccentricity between mating parts having equal wall thickness, "$t$". It can be shown analytically that the magnitude of stress concentration is a function of "$e/t$"; thus, thin walls require greater precision in manufacturing.

In order to achieve light weight, an eccentricity of not more than 10% of the wall thickness is permissible. Since the wall thicknesses desired are of the order of 0.020 to 0.100 inch, the allowable eccentricity is then only 0.002 to 0.010 inch. The precision required then approaches machine shop practice rather than sheet metal fabrication methods.

Eccentricities as shown in FIGURE 1 are more likely to occur in girth welds than in the longitudinal weld. The longitudinal weld is generally made under the most favorable conditions with minimum of restraint from the thin sheet ends to obtain good fit-up. Little or no mis-match may be expected between butt ends of the same sheet when thickness is held to close tolerances, and with good hold-down fixtures during welding.

These conditions are not true for girth welds; these welds are made between mating parts whose forms offer some degree of rigidity, being at best closed circles of varying diameter which must match.

The use of weld back-up rings at girth welds during fabrication brings the butt ends into alignment, as illustrated in FIGURE 2 (also in exaggerated scale). However, the alignment thus obtained is only local in character, and while the joint is improved by making the eccentricity less abrupt, thereby reducing ductility requirements, the eccentricity is not reduced in magnitude.

The eccentricity introduces local bending stresses which must be added to the nominal membrane stresses. While the bending stresses are predominantly in the meridional plane, the eccentricity also increases the critical hoop stresses due to Poisson's ratio for the material.

My co-pending patent application Serial Number 763,114, now U.S. Patent No. 3,096,576, describes an improved method for forming high quality head closures having uniform wall thickness along any meridian, and also providing high accuracy and reproducibility.

It is then the purpose of this invention to provide improved fabrication methods for achieving the required greater accuracy for the shell to match the head closure.

It is known that higher precision shell fabrication can be achieved by first fabricating the shell to a smaller diameter, then stretching it beyond the yield point of the material within a die to final dimensions. The material then takes a permanent set to the contour of the die, the final dimensions then determined by the internal diameter of the die, which may be machined to close tolerances. Reproducibility is then greatly enhanced, thus insuring greater reliability.

Present techniques for expanding shells require large heavy dies which completely enclose the entire shell. Heavy end closures are required which become a formidable structural problem in the larger diameters now required. Sealing means for application of internal hydraulic pressure to the shell become troublesome, requiring shell precision not yet reached in the production cycle. Also, the sealed shell ends must be restrained from expanding in order to maintain a seal, requiring subsequent trimming.

The stretching operation is, however, highly desirable as an economical quality control measure early in the production cycle. In addition to the improved accuracy, it may be considered also as an effective functional inspection method for the longitudinal weld supplementing X-ray, Magnaflux, and other visual inspection methods. It may be done early in the fabrication process, before investment of considerable sums in materials and labor, including expensive machining operations, to reach a final product before hydrotest may be conducted.

It is well established by theory [1] that radial forces or pressures applied only over a small portion of the length of cylindrical shells result in only local deformation of the shell. The extent to which the shell is deformed beyond the point of application of the load is limited, having a rapidly damped wave form, the length of which is a function of a parameter, $\beta$, of the shell geometry and material.

Use can be made of this principle to expand the shell in increments of its length, each increment overlapping a portion of the preceding increment. In this manner, the entire length of the shell may be conveniently expanded, requiring only a short section of external die ring; simple means may then also be provided for application of the internal pressure locally over a small length associated with the external die ring, eliminating sealing engagement with the shell, as will be described later. Large, expensive dies housing the complete shell may be eliminated, as well as trimming operations on shell ends.

It is, therefore, a primary object of this invention to provide improved means for fabricating thin walled shells which have high dimensional accuracy with respect to diameter, circularity and linearity.

Another object is to provide means whereby shells of high accuracy may be reproduced in quantities with uniform high quality for increased reliability.

Another object is to achieve the high accuracy by expanding the shell to final dimensions controlled by carefully machined dies.

Another object is to provide simple means for expanding the shell incrementally over a portion of its length in progressive overlapping steps requiring simple equipment.

Another object is to expand the shell by fluid pressure having completely self-contained expansible means requiring no fluid seals engaging the shell.

Another object is to provide simple means whereby the shell may be conveniently supported while undergoing incremental expansion.

Another object is to provide automatic means for

---

[1] Timoshenko: "Theory of Plates and Shells," McGraw-Hill Book Co., Inc., New York, N.Y., 1940.

traversing the length of the shell in fixed increments, with expansion of the shell occurring at each increment.

Another object is to perform stretching operation after end closures are attached to the shell.

Another object is to test portions of the pressure vessel structure either before or after heat treatment without the necessity to test the complete structure.

These and other objects will become apparent from the following detailed description read in connection with the annexed drawings, in which similar reference characters represent similar parts, and in which:

FIGURE 3A is a fragmentary view in sectional elevation of the apparatus of FIGURE 3, the view showing the arrangement of parts at the beginning of the operational cycle.

FIGURE 5 is a plan view of the apparatus shown in FIGURE 3, with the shell removed.

FIGURE 7 is a schematic diagram of the control system for either manual or automatic operation of the progressive incremental expander.

FIGURE 8 shows another embodiment of apparatus in accordance with this invention for progressive incremental expansion of a shell.

FIGURE 9 is a partial sectional view in side elevation showing revisions to the apparatus of FIGURE 3 for use in connection with a shell having end closures attached thereto.

Figure 1:
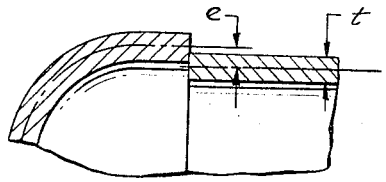
FIGURE 1 illustrates in exaggerated form a possible eccentricity between mating parts of a pressure vessel fabricated by conventional methods.
Figure 2:
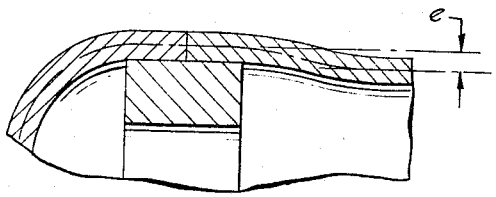
FIGURE 2 illustrates, also in exaggerated form, the same eccentricity remaining after use of a local back-up ring during fabrication.
Figure 3:
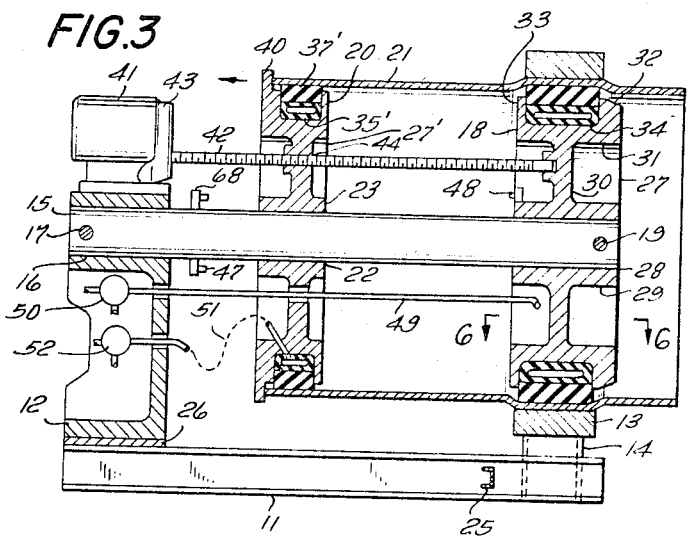
FIGURE 3 is a sectional elevational view taken on line 3—3 of FIGURE 4, illustrating one form of apparatus in accordance with this invention for progressive incremental expansion of a shell to eliminate the eccentricity shown in FIGURES 1 and 2.
Figure 4:
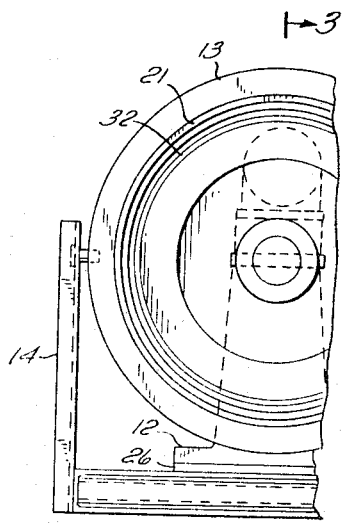
FIGURE 4 is a part fragmentary end view of the apparatus shown in FIGURE 3.

The construction of one form of apparatus for expanding a shell incrementally is shown in FIGURES 3, 4 and 5. Referring to FIGURE 3, the base 11 has a pedestal 12 mounted on one end, and an external die ring 13 mounted on its opposite end. The die ring 13 is supported from the base by two channels 14 each disposed vertically at opposite sides of the die ring 13, only the left-hand channel being illustrated in FIGURE 4.

In the following description, the pedestal end, or left side of FIGURE 3, is referred to as the forward end, while the die ring end, or right side of FIGURE 3, is referred to as the aft end. This is indicated by the arrow of FIGURE 3.

A support 15 extends from the bore 16 of the pedestal 12 and is fixed thereto by the pin 17. An internal expander assembly 18 is fixed to the opposite end of the support 15 by another pin 19. The length of the support 15 is selected so as to maintain the desired relationship between the internal expander assembly 18 and the external die ring 13.

A jig assembly 20 for supporting one end of the shell 21, is slidably mounted on the support 15 which passes through the bore 22 in the boss 23 of the jig assembly. The outer peripheral surface of the jig assembly has expansible means, described later, which enable it to grip the inner diameter of the shell 21 to form a rigid support, and to impart translational motion to the shell when the jig assembly is moved.

As shown in FIGURE 5, the base 11 comprises two side channels 24 bent to form the sides of an A-frame, with a transverse channel member 25 forming a spacer holding the aft ends of the A-frame in fixed relation. A mounting plate 26 is securely attached to the side channels at the apex of the A-frame, and is adapted to receive the pedestal 12, secured thereto as by bolts 26a. The various parts of the base, including the vertical channels 14, are securely joined as by welding, forming a rigid sub-assembly.

The construction of the internal expander may now be described with reference to FIGURES 3 and 6. An internal ring 27 has a central bore 28 thru a boss 29 for assembly onto the support 15. Extending outwardly from the boss is a web 30 joining a rim 31 having radial extensions 32 and 33 forming an annular channel 34.

An expansible and collapsible circular bladder 35, made of elastomeric materials and having an elongated toroidal cross-section, fits within the channel 34. A suitable connector 36 for admitting or expelling fluid may be secured to the bladder in a manner well known for inner tube construction for tires.

A casing 37 in the form of a hollow cylinder also fits within the channel 34 engaging the outer circumference of the bladder 35 and the radial extensions 32 and 33 of the rim 31. The casing is constructed with several plies of fabric reinforcement 38 embedded within an elastomeric material 39; the fabric having cords oriented in the axial direction to provide rigidity against elongation of the elastomer in the axial direction, but having no cords, or only lightly woven cords in the circumferential direction to provide freedom for circumferential elongation to permit radial expansion. Or, a tricot knitted fabric or stockinette may be used, having the directional properties above described. The anisotropic properties of the casing 37 thus obtained prevents lateral extrusion of the elastomer due to Poisson's ratio when pressure is applied normally from the bladder.

The radial extension 32 on the aft side of the rim 31 has a tapered or frusto-conical surface, to act as a guide for the shell when inserting it over the expander assembly when being loaded into the machine.

The above principles of construction for the expander assembly 18 have also been applied to the construction of the jig assembly 20 having an expansible outer diameter. In the case, the expansible casing 37′ and bladder 35′ are only approximately one-half the length of the similar parts in the internal expander assembly, the metal ring 27′ being modified accordingly. In this case, however, the forward radial extension 40 extends beyond the diameter of the shell thereby providing a positive stop for positioning the shell on the jig assembly.

When the jig assembly is pressurized, it provides a tight grip on the shell which is capable of supporting the weight of the shell suspended as a cantilever beam from the jig assembly with no additional outboard support. The jig assembly thus holds the shell in fixed relation to the centerline of the apparatus.

For smaller size shells, the jig assembly and shell may be displaced manually along the support 15. For larger size shells, it may be power operated as shown in FIGURE 3 where a reversible electric motor 41 is mounted on the upper end of the pedestal 12, driving the screw-jack 42 thru the gear reduction box 43. The screw-jack engages threads 44 in the jig assembly 20, the aft end of the screw-jack being supported by the expander assembly 18. Suitable limit switches such as 48 mounted on the expander assembly 18, and switches 47 and 68 which may be adjustably mounted on the support 15 interrupt electrical circuits and establish limits of travel of the jig assembly and shell in either direction.

Fluid is supplied to the internal expander assembly 18 thru tubing 49 connected to the inlet connector 36 on the bladder (FIGURE 6), and to a three way control valve 50 mounted on the pedestal, the latter in turn being connected to a source of fluid pressure (not shown). In general, hydraulic or incompressible fluid is preferred for actuating the internal expander since relatively high pressures of 500 p.s.i. or more may be used.

A separate supply of fluid is provided for actuating the expansible jig assembly 20. Relatively low pressures are required to support the shell, for the pressure used must not exceed the yield point of the shell material. Since the pressure required will be substantially less than 100 p.s.i., pneumatic pressure may be used. Another three way valve 52 also mounted on the pedestal is connected by means of flexible tubing 51 to the bladder connector in the jig assembly.

A control system for power operation of the apparatus is shown in FIGURE 7, and provides for either manual or automatic means for cyclic operation of the expander assembly and the drive assembly alternately.

A single wire ground return electrical system is shown in which 55 is a master control On-Off switch connected to a source of electrical energy (not shown); 56 is a selector switch for selectively supplying current from the master switch to either of the automatic or manual control circuits; 60 is a manually operated switch in the manual control circuit for reversing the direction of rotation of the electric motor 64; 47, 48, and 68 are normally closed limit switches, operated by position of the jig assembly; 71 is a timer in the automatic control circuit which sequentially supplies current to the solenoid 54 of the hydraulic valve 50 supplying fluid to the expander assembly; thence to the electric motor 64 which drives the jig assembly 20 and shell 21; 69 and 70 are manual switches for operating the solenoids 54 and 53 respectively; the latter in turn operating the hydraulic and pneumatic valves 50 and 52 respectively.

The operation of the complete apparatus may now be described.

The jig assembly 20 is at its extreme aft end, next to the internal expander assembly 18, at the beginning of the cycle as is depicted in FIGURE 3A.

An under-sized shell, with its material heat-treated to the soft-annealed condition, is inserted between the internal expander 18 and the external die-ring 13. The forward end of the shell is then aligned preferably slightly aft of the forward edge of the expander casing 37. The shell is externally supported in this position by a hoist or dolly (not shown), altho such means may be readily appended to the apparatus if necessary or desired.

The manual switch 69 of FIGURE 7 is then closed, energizing the solenoid 54 of the three-way hydraulic valve 50, supplying fluid through the flexible tubing 49 and connector 36 to the bladder 35, for expansion of the first increment at the forward end of the shell. After expansion, the switch 69 is manually opened, returning the three-way valve to its vent position, allowing the bladder 35 of the internal expander to contract.

The shell is then advanced forward (manually or by external means not shown, the expanded shell end passing over the jig assembly and making contact with the flange 40 which acts as a stop for positioning the shell.

Since the jig assembly was made approximately one-half the axial length of the internal expander 18, a substantial portion of the preivously expanded section remains between the expander 18 and die ring 13, providing adequate overlap.

Switch 70 is now manually closed, energizing the solenoid 53 of the pneumatic valve 52, causing the bladder 35' of the jig assembly to expand and cause the expansible casing 37' to firmly grip the shell.

The apparatus is now in position for automatic cycling to proceed. By operating selector switch 56 to close contacts 57 and 59, current is supplied to the automatic timer 71. This timer is of the type commercially available which always returns to its zero setting when de-energized; therefore, the current flow thru the timer will be directed first to the solenoid 54, operating the hydraulic valve 50 to the expander, stretching the next increment of the shell. During this cycle, current is supplied by the constant speed rotor 65 to the segment 66; after elapse of a pre-set time, the rotor leaves the segment 66, opening the circuit to the solenoid 54, venting the hydraulic valve 50, and contracting the expander. After a shorter pre-set time delay, the rotor 65 contacts the segment 67, closing the circuit to the electric motor 64, so as to drive the jig assembly and shell in the forward direction. This duration is pre-set to displace the shell the desired distance for each increment, after which, the rotor 65 breaks contact with segment 67, stopping motor, and after another short time delay, the above cycle repeats itself continuously, as described. When the jig assembly and shell reach the extreme end of forward travel, determined by the length of shell to be expanded, the jig assembly will contact limit switch 68, opening the circuit to the automatic timer, ending automatic cycling. Expansion of the final increment in this position may then be done manually, by closing the manual switch 69, similarly to manual operation for initiation of the cycle. When operating the system manually, limit switch 47 will open the circuit at extreme limit of travel in forward direction.

The shell may then be removed from the apparatus by returning the jig assembly to its initial extreme aft position next to the expander assembly. This may be done by placing the selector switch 56 for "MANUAL" operation by closing contacts 57 and 58, and then holding contacts 61 and 60 closed until the limit switch 48 opens at the extreme position of travel. Manual switch 70 is then opened de-energizing solenoid 53, venting pneumatic valve 52. The shell may then be removed.

Figure 6:
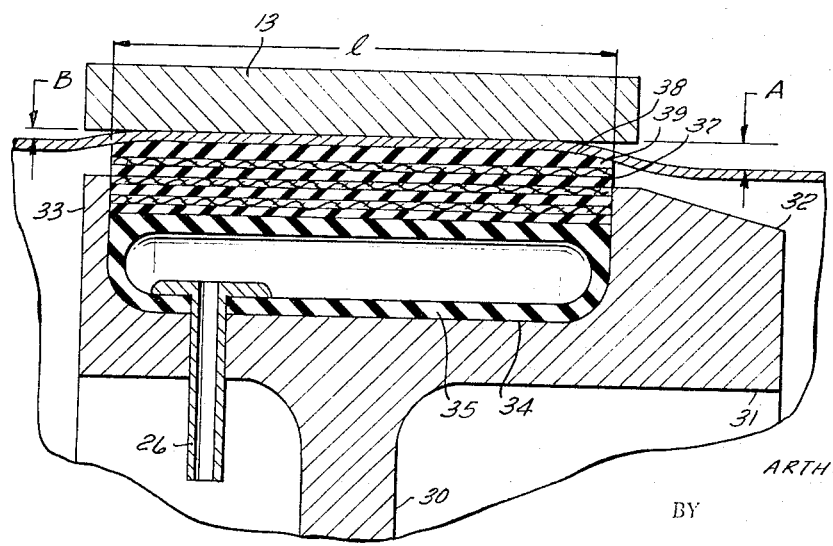
FIGURE 6 is an enlarged fragmentary sectional view taken on the line 6—6 of FIGURE 3 showing details of construction of the fluid internal expander.

The action of the incremental expander on the shell is illustrated in FIGURE 6. The un-expanded shell is shown to the right in FIGURE 6, where the dimension A indicates the total radial elongation occuring when the shell is expanded against the die ring under pressure from the expander.

The final diameter of the ring is indicated to the left in FIGURE 6, where the dimension B represents the radial contraction due to spring-back when the internal pressure is relieved.

The shell is subjected to pressure over the distance $l$ during each cycle, $l$ representing the length of the expansible casing 37 in the expander assembly 18. The shell wall transition from the unexpanded section to the expanded portion, and again from the expanded portion to the sprung back section, is gradual.

The length of this transitional section is a function of the parameter $\beta$ as defined in the reference noted above. This transitional section is relatively small compared to the total incremental length, $l$, shown in FIGURE 6, if the latter is made to have a value so that $\beta l = 10$. The expanded portion $l$ then acts as a long cylinder.

The value of $\beta$ and thence $l$, may be readily calculated for any particular shell size. Generally, since the value of $\beta$ for typical thin-wall shells of interest may be somewhere near one, the actual value of $l$ may then be approximately ten inches.

The shell may then be advanced approximately one half the value of $l$ for each succeeding increment, thereby insuring good overlap between successive increments to achieve straightness as well as roundness.

Straightness can be achieved since the forward end is first expanded before engaging the jig assembly. The latter then holds the shell in fixed relation to the centerline of the apparatus during subsequent operations. Upon expansion of the shell, the overlapping portion of the previously expanded increment first makes contact with the external die ring, since it is already at a larger diameter, after which the adjoining unexpanded section continues to expand until it also makes contact with the die wall. Therefore, each succeeding increment will be concentric about the same centerline. Since the spring-back for a homogeneous material will be the same for each increment, the diameter of each increment will also be the same; from which it follows that the shell walls will be straight.

FIGURE 8 represents another embodiment of an apparatus for an incremental expander containing the same basic principles described above. In this arrangement, the shell 21 is mounted vertically with the expander assembly 18 supported in a horizontal plane by the support 15 which now acts as a compression member or column, instead of a beam, as in FIGURE 3.

Two or more channels 101 are equally spaced about a base 102 having a central bore 103 for receiving the support 15, retained by the pin 17. The vertical channels 101 support the horizontally mounted external die ring 13 near their upper end in the desired relation to the internal expander 18.

The jig assembly 104 of FIGURE 8 may be simplified compared to the similar part 20 of FIGURE 3. The expansible diameter and pneumatic system is no longer required since the jig 104 supports the weight of the shell 21 directly, with gravity causing the shell 21 to follow the motion of the jig 104.

The jig 104 is guided on the centerline of the apparatus by the bore 22 in the boss 23 which engages the support 15. The shell 21 is maintained concentric with the jig 104 by the tapered surface 105 of the rim 106.

The power train for raising and lowering the jig 104 and shell 21 (not shown in FIGURE 8) may in general be similar to that shown in FIGURES 3 and 7 thus providing automatic cycling for rapid expansion of a shell.

In order to reduce the power requirements for the apparatus of FIGURE 8, the weight of the jig 104 and shell 21 may be counterbalanced by the counterweights 110. This is done by providing lugs 107 extending thru slots 111 in the channels 101, with flexible cable passing over a pulley 109 and attached at one end to the lug 107 and at the opposite end to the counterweight 110. The pulley is supported by a suitable bracket 112 attached to the upper end of channel 101.

The apparatus of FIGURE 8 offers some advantage of simplicity and reduced floor space, at the disadvantage of requiring greater roof clearance to accommodate the increased height, especially for loading and unloading.

FIGURE 9 illustrates a modification and use of the incremental expander apparatus to perform rounding and straightening operations on a solid propellant rocket case having end closures attached to the shell.

To accomplish this, use is made of the fact that such rocket cases generally have a small central opening in the forward head closure for attachment of an igniter; and a larger central opening in the aft head closure for attachment of a nozzle. The case may then be installed on the apparatus by first removing the internal expander 18 and the jig assembly 20. The forward head closure, having a smaller opening 121 is then positioned by a suitable adapter 120 on the support 15.

The internal expander assembly 18 of FIGURE 3 is then replaced by a segmented internal expander 118 which may be assembled within the rocket case. The latter is made up of segments 119 having a rim 131, radial extensions 132 and 133 and a web portion 130, each segment extending over a portion of the circumference, and adapted so that when bolted to the web 130' of the central hub 135, the segments form a complete circumference. The central hub 135 has a boss 29 for attachment to support 15, in the manner previously described, the central hub 135 being of smaller diameter than the opening 136 in the aft head of the rocket case to facilitate assembly within the case. The operation of the apparatus is then the same as described.

The same apparatus and installation shown in FIGURE 9 may then also be used to perform hydrostatic tests over a portion of the pressure vessel. For example, the openings 136 and 121 must usually be final machined after heat treatment before suitable end closures may be attached for hydrostatic test. The apparatus as shown in FIGURE 9 would then permit hydrostatic tests of a portion of the structure immediately following heat-treatment and before investment of considerable labor in additional machining operations. Such tests could be performed progressively over the entire shell length as a quality control measure insuring that the desired allowable stress level in the critical hoop direction had been achieved. It would be necessary to remove the external die ring 13 during such hydrostatic tests or replace the die ring with one of larger internal diameter since the elastic strain at high stress levels after heat-treatment would generally be greater than the springback of the material (dimension B, FIGURE 6) in the soft annealed condition.

Thus, important improvement in fabrication of shells for pressure vessels may be accomplished providing high accuracy, improved reproducibility and hence greater reliability. While several embodiments and arrangements of my invention have been described, it is understood that changes and modifications may be made therein without out departing from the spirit and scope of the invention. The limits of the invention are set forth in the following claims.

I claim:

1. An apparatus for expanding pressure vessel shells comprising in combination a base, a pedestal attached thereto at one end; an external die-ring in the form of a short hollow cylinder mounted at the opposite end of said base, said die-ring having a larger internal diameter than the shell to be expanded; a support fixed at one end to said pedestal; an internal, basically cylindrical, expander assembly fixed to the opposite end of said support and axially positioned to lie substantially within and concentric with said external die-ring, said expander assembly comprising fluid pressure actuated, flexible expansible means extending circumferentially of the assembly and axially of said die-ring over a major portion of its length; an expansible and contractible casing fabricated of elastomeric material extending circumferentially of and engaging the outer periphery of said fluid pressure-actuated, flexible, expansible means, said casing being axially positioned to lie substantially within and concentric with said external die-ring and comprising reinforcement means embedded within the elastomeric material of the casing for imparting directional properties to the casing restricting elongation in the axial direction, and permitting elongation in the circumferential direction; a jig assembly slidably mounted on said support and capable of axial displacement between the internal expander assembly and the pedestal; means associated with the jig assembly adapted to support one end of said shell with its wall passing between the internal expander assembly and external die-ring; and means for feeding fluid under pressure to said flexible expansible means to actuate said means and expand a portion of the shell radially outwardly against said external die-ring.

2. An apparatus according to claim 1 and including power driven means for axial displacement of said jig assembly and shell supported thereby.

3. An apparatus according to claim 2 and including control means for alternately actuating said fluid feeding means and said power driven means, for expanding a portion of the shell and then causing axial displacement of the jig assembly and shell supported thereby.

4. An apparatus according to claim 3 and including automatic control means for continuously cycling the means for actuating said fluid feeding means and the power driven means for axial displacement of the jig assembly and shell supported thereby, each means operating intermittently and alternately with the other.

5. An apparatus according to claim 4 in which the axial displacement of the jig assembly and shell supported thereby during each cycle, is less than the length of the internal expander.

6. An apparatus for expanding hollow bodies comprising, in combination, a base, an external die in the form of a short hollow cylinder supported from said base; an internal, basically cylindrical, expander supported from said base and positioned internally of said die so as to be axially aligned and concentric with said die, said internal expander comprising fluid pressure actuated, flexible expansible means extending circumferentially of the expander and axially of said die over a major portion of its length; an expansible and contractible casing fabricated of elastomeric material extending circumferentially of and engaging the outer periphery of said fluid pressure-actuated, flexible, expansible means, said casing being axially positioned to be substantially within and concentric with said external die and comprising reinforcement means embedded within the elastomeric material of the casing for imparting directional properties to the casing restricting elongation in the axial direction, and permitting elongation in the circumferential direction; a movable support for supporting the hollow body to be expanded with its wall passing between the said internal expander and external die; and means for feeding fluid under pressure to said flexible, expansible means to actuate said means and expand a portion of the hollow body against the die.

7. An apparatus according to claim 6 and including power driven means for axial displacement of the movable support and hollow body supported thereby.

8. An apparatus according to claim 7 and including control means for alternately actuating said flexible expansible means and said power driven means, for expanding a portion of the hollow body and then causing axial displacement of the movable support and hollow body supported thereby.

9. An apparatus according to claim 8 and including automatic control means for continuously cycling the means for actuating said fluid feeding means and the power-driven means for axial displacement of the movable support and hollow body supported thereby, each means operating intermittently and alternately with each other.

10. An apparatus according to claim 9 in which the automatic control means provides an intermittent axial displacement of the movable support, and hollow body supported thereby, said axial displacement being less than the length of the internal expander, thereby providing expansion of the hollow body in progressive overlapping increments.

11. An apparatus according to claim 6 wherein said die, expander and support have a common vertical axis and including means whereby the weight of the movable support and hollow body supported thereby, is substantially counterbalanced.

12. An internal expander assembly for expanding hollow bodies comprising in combination a ring, radial flanges extending outwardly at each end of said ring to form an annular channel; an expansible and collapsible bladder formed of elastomeric materials and adapted to fit within said channel and engaging the ring and flanges thereof; and expansible and contractible casing fabricated of elastomeric materials and adapted to fit within said channel, engaging the outer periphery of said bladder, said casing comprising fabric reinforcement embedded within the elastomeric materials of the casing for imparting directional properties to the casing restricting elongation in the axial direction, and permitting elongation in the circumferential direction; and means for admitting and expelling fluid into and out of said bladder.

13. An apparatus for performing rounding and straightening operations and hydrostatic tests on a solid propellant rocket case comprised of a shell and end closures attached to the shell and having a relatively small central opening in the forward head closure and a larger central opening in the aft head closure, said apparatus comprising, in combination, a base, an external die-ring in the form of a short hollow cylinder supported from said base and having a larger internal diameter than said shell; a support fixed to said base; an internal basically cylindrical expander assembly fixed to one end of said support and axially positioned thereon to lie substantially within and concentric with said external die-ring, said expander assembly comprising a hub secured to said support and having a web, said hub being of a smaller diameter than said larger central opening, channelled segments removably secured to said web and together forming a circumferentially channel segmented annular rim concentric with said die-ring, and fluid pressure-actuated, flexible, expansible means positioned in the circumferential channel of said rim and extending circumferentially of said rim and axially of said die-ring over a major portion of its length; an expansible and contractible casing fabricated of elastomeric material extending circumferentially of and engaging the outer periphery of said fluid pressure-actuated, flexible, expansible means, said casing being axially positioned to lie substantially within and concentric with said external die-ring and comprising reinforcement means embedded within the elastomeric material of the casing for imparting directional properties to the casing restricting elongation in the axial direction, and permitting elongation in the circumferential direction; an adapter sized to fit said smaller central opening of said forward head closure to support said case at its head closure end, said adapter being slidably concentrically mounted to said support, for axial displacement of said case relative to said expander assembly; and, means for feeding fluid under pressure to said flexible expansible means to actuate said means and exert a uniformly distributed radial pressure against a portion of the shell interposed between said rim and said die-ring.

References Cited by the Examiner

UNITED STATES PATENTS

| 1,494,128 | 5/1924 | Primrose | 153—80.5 |
| 1,813,096 | 7/1931 | Stenner | 153—80.5 |
| 2,423,862 | 7/1947 | Vorobik. | |
| 2,469,597 | 5/1949 | Guigas. | |
| 2,773,538 | 12/1956 | De Mers | 153—73 |
| 2,780,271 | 2/1957 | Ewart | 153—80.5 |

FOREIGN PATENTS

| 532,335 | 10/1956 | Canada. |
| 772,134 | 4/1957 | Great Britain. |

CHARLES W. LANHAM, *Primary Examiner.*

I. J. ROTKIN, *Examiner.*

H. E. RILEY, R. J. HERBST, *Assistant Examiners.*